United States Patent
Albot et al.

(10) Patent No.: US 8,949,798 B2
(45) Date of Patent: Feb. 3, 2015

(54) FRAMEWORK FOR CONDITIONALLY EXECUTING CODE IN AN APPLICATION USING CONDITIONS IN THE FRAMEWORK AND IN THE APPLICATION

(75) Inventors: Andre Laurent Albot, Austin, TX (US); Michael Gerard Mall, Round Rock, TX (US); Bruce G. Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 13/402,326

(22) Filed: Feb. 22, 2012

(65) Prior Publication Data

US 2012/0216078 A1    Aug. 23, 2012

Related U.S. Application Data

(62) Division of application No. 11/751,599, filed on May 21, 2007, now Pat. No. 8,127,277.

(51) Int. Cl.
*G06F 9/44* (2006.01)
*G06F 11/00* (2006.01)
*G06F 11/36* (2006.01)

(52) U.S. Cl.
CPC ............................ *G06F 11/3688* (2013.01)
USPC ........................ 717/127; 717/124; 714/38.1

(58) Field of Classification Search
CPC  G06F 11/362; G06F 11/3644; G06F 11/3688
USPC ............................ 717/124–135; 714/37, 38.1
See application file for complete search history.

(56) References Cited

U.S. PATENT DOCUMENTS

| 5,671,352 | A | 9/1997 | Subrahmaniam et al. |
| 6,401,218 | B1 | 6/2002 | Linam et al. |
| 6,418,543 | B1 * | 7/2002 | Goli et al. ............ 714/38.1 |
| 6,477,666 | B1 | 11/2002 | Sanchez et al. |
| 6,484,276 | B1 | 11/2002 | Singh et al. |
| 6,496,975 | B1 | 12/2002 | Slinger |
| 6,598,179 | B1 | 7/2003 | Chirashnya et al. |

(Continued)

FOREIGN PATENT DOCUMENTS

EP    0388526 A3    9/1990

OTHER PUBLICATIONS

Office Action, dated Jun. 22, 2011, regarding U.S. Appl. No. 11/751,599, 11 pages.

(Continued)

*Primary Examiner* — Qing Chen
(74) *Attorney, Agent, or Firm* — Yee & Associates, P.C.; Damion Josephs

(57) ABSTRACT

A computer implemented method, apparatus, and computer usable program code for returning a return code to an error hook in an application using a framework. An identifier and a pass-through are received from the error hook. The error hook is software code in the application. The pass-through is a set of parameters. If the identifier has an active status, a set of framework conditions is retrieved using the identifier. If the set of framework conditions is met, an inject callback is retrieved using the error identifier. The inject callback is called with the error identifier and the pass-through. An inject callback return code is received. If the inject callback return code is an execute return code, the execute return code is returned to the error hook.

10 Claims, 5 Drawing Sheets

(56) References Cited

U.S. PATENT DOCUMENTS

| | | | |
|---|---|---|---|
| 6,701,460 | B1 | 3/2004 | Suwandi et al. |
| 6,810,523 | B2 | 10/2004 | Segev et al. |
| 6,973,643 | B2 | 12/2005 | Goldsmith et al. |
| 7,007,198 | B2 | 2/2006 | Boling |
| 7,168,009 | B2 * | 1/2007 | Darringer et al. ............ 714/38.1 |
| 7,207,047 | B2 | 4/2007 | Subramanian et al. |
| 7,370,231 | B2 | 5/2008 | Fossum et al. |
| 7,536,605 | B2 | 5/2009 | Keaffaber et al. |
| 7,634,778 | B2 | 12/2009 | Mosier et al. |
| 7,757,215 | B1 | 7/2010 | Zhou et al. |
| 7,793,149 | B2 | 9/2010 | Mall et al. |
| 8,127,277 | B2 | 2/2012 | Albot et al. |
| 8,533,679 | B2 * | 9/2013 | Showalter et al. ........... 714/38.1 |
| 2003/0018681 | A1 | 1/2003 | Subramanian et al. |
| 2003/0023905 | A1 | 1/2003 | Boling |
| 2003/0037291 | A1 | 2/2003 | Goldsmith et al. |
| 2004/0060039 | A1 * | 3/2004 | Fujikawa et al. ............. 717/124 |
| 2004/0268370 | A1 | 12/2004 | Mosier et al. |
| 2005/0066234 | A1 * | 3/2005 | Darringer et al. ................ 714/38 |
| 2006/0123389 | A1 * | 6/2006 | Kolawa et al. ................ 717/101 |
| 2006/0156153 | A1 | 7/2006 | Fossum et al. |
| 2008/0178044 | A1 * | 7/2008 | Showalter et al. .............. 714/34 |
| 2008/0201604 | A1 | 8/2008 | Mall et al. |
| 2008/0244536 | A1 * | 10/2008 | Farchi et al. ................... 717/130 |
| 2008/0295081 | A1 | 11/2008 | Albot et al. |

OTHER PUBLICATIONS

Response to Office Action, dated Sep. 7, 2011, regarding U.S. Appl. No. 11/751,599, 9 pages.

Notice of Allowance, dated Oct. 24, 2011, regarding U.S. Appl. No. 11/751,599, 13 pages.

* cited by examiner

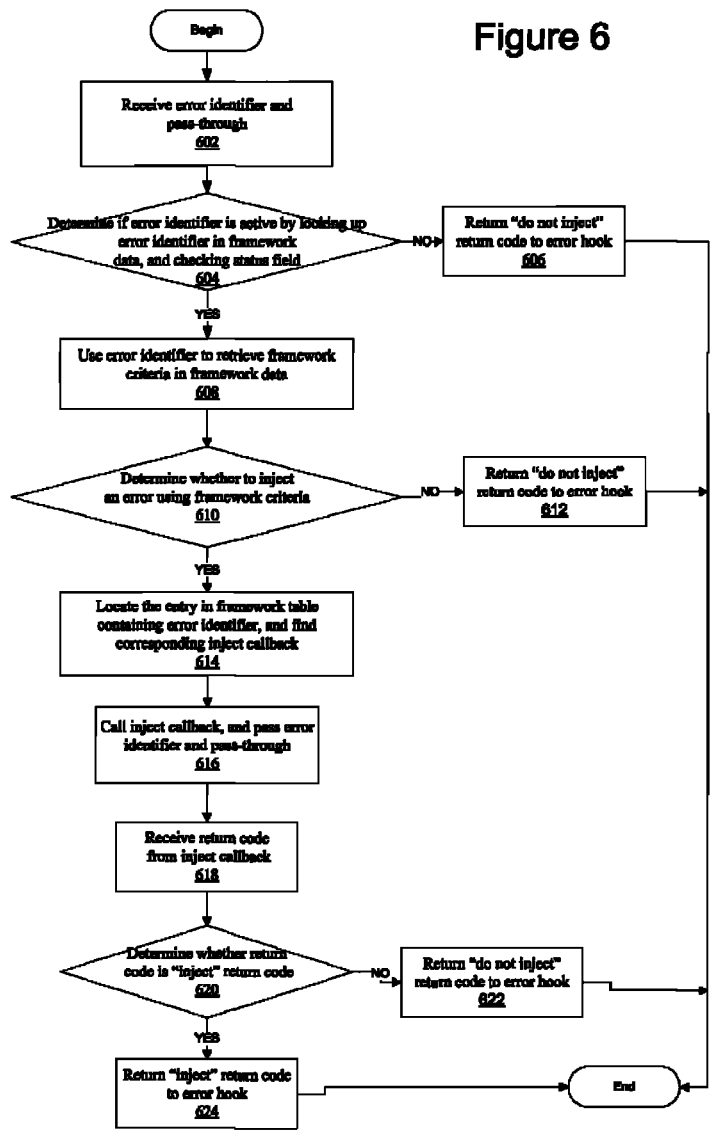

FRAMEWORK FOR CONDITIONALLY EXECUTING CODE IN AN APPLICATION USING CONDITIONS IN THE FRAMEWORK AND IN THE APPLICATION

This application is a divisional of U.S. patent application Ser. No. 11/751,599 filed May 21, 2007, now U.S. Pat. No. 8,127,277 status allowed.

This invention was made with United States Government support under Agreement No. NBCH3039004 awarded by Defense Advanced Research Projects Agency (DARPA). The Government has certain rights in this invention.

BACKGROUND OF THE INVENTION

1. Field of the Invention

The present invention is related generally to a data processing system and in particular to a method and apparatus for executing code. More particularly, the present invention is directed to a computer implemented method, apparatus, and computer usable program code for testing of error handling code in software applications.

2. Description of the Related Art

A software component contains blocks of code. Each block of code is a portion of code for performing a particular task. A software component may contain one or more conditional branches. A conditional branch determines whether a specific condition is present, and based on the determination; the software component executes a specific block in the software component. Thus, each condition may have a corresponding block of code which is executed when the condition is present. One example of a conditional branch is determining whether an error condition is present. In this example, when a specific error condition is present, the software component executes the block of code corresponding to the error condition.

When testing a software component, executing all possible blocks of code in the software component is difficult, because many error conditions only occur rarely and may be difficult to create or simulate.

SUMMARY OF THE INVENTION

The illustrative embodiments provide a computer implemented method, apparatus, and computer usable program code for returning a return code to an error hook in an application using a framework. In response to receiving an identifier and a pass-through from the error hook, a determination is made as to whether the identifier has an active status. The error hook is software code in the application and the pass-through is a set of parameters. In response to a determination that the identifier has an active status, a set of framework conditions using the identifier is retrieved. In response to a determination that the set of framework conditions is not met, a do not execute return code is returned to the error hook in the application. In response to a determination that the set of framework conditions is met, an inject callback is retrieved using the error identifier. The inject callback is a block of code in the application. In response to calling the inject callback with the error identifier and the pass-through, an inject callback return code is received. The execute return code is returned to the error hook in response to a determination that the inject callback return code is an execute return code.

The illustrative embodiments also provide for a computer implemented method, apparatus, and computer usable program code for testing a software application having a first subroutine for handling a first error that may occur during execution of the software application. A first code is inserted into the software application. The first code will cause the software application to return the first error upon execution of the software application. The software application is executed. The first error occurs during execution. A first error report is generated using the first subroutine. The first error report is stored in a memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart illustrating the process for injecting is depicted in accordance with an illustrative embodiment.

DETAILED DESCRIPTION OF THE PREFERRED EMBODIMENT

Figure 1:
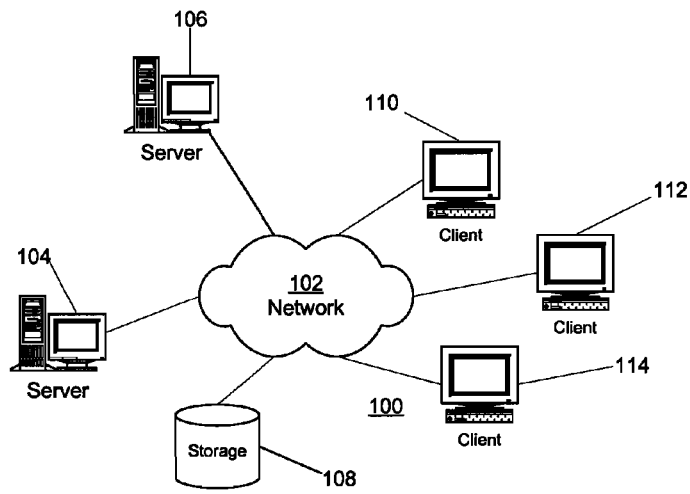
FIG. 1 is a pictorial representation of a network of data processing systems in which illustrative embodiments may be implemented.
Figure 2:
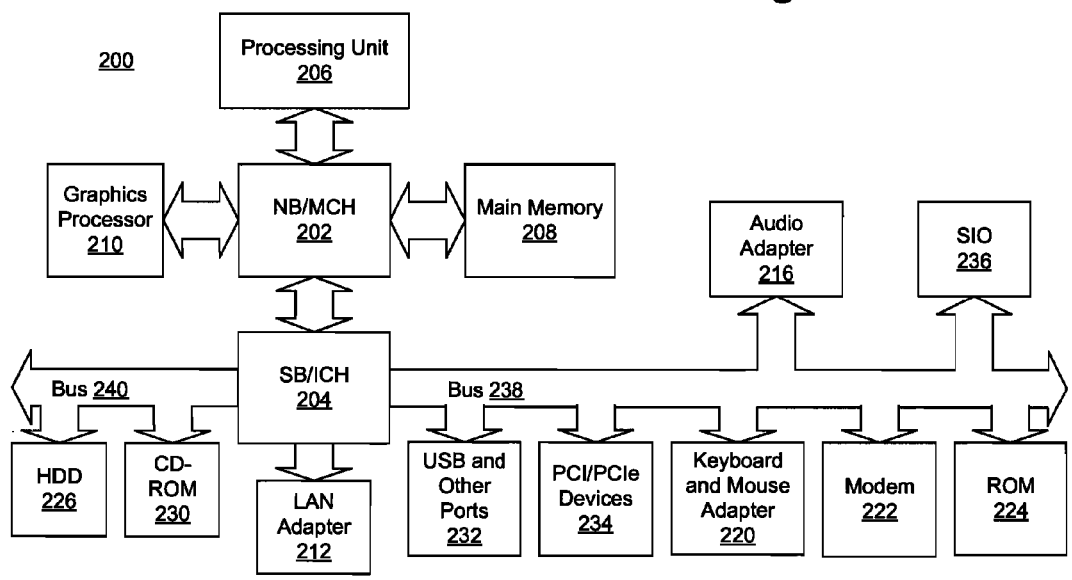
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
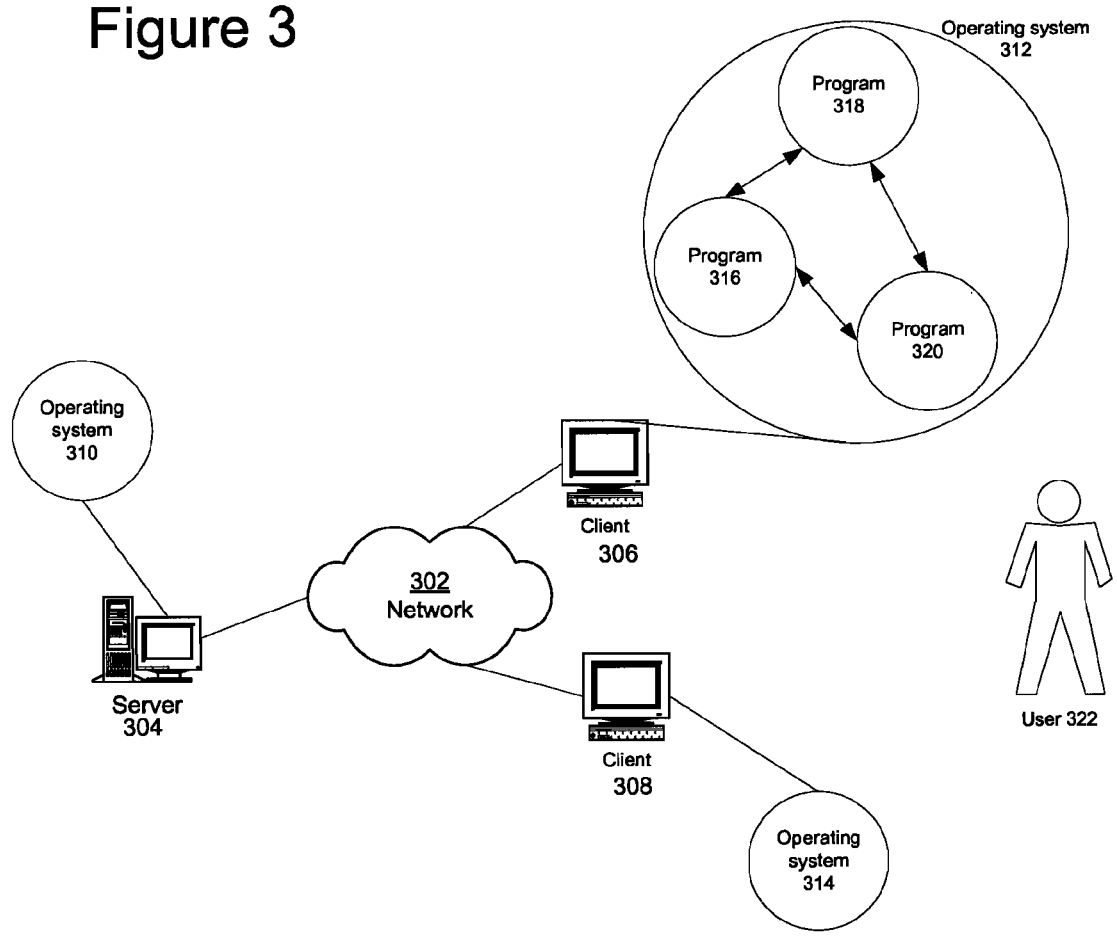
FIG. 3 is a block diagram of data processing system running software in which illustrative embodiments may be implemented.

FIG. 3 is a block diagram of a networked data processing systems running software in which illustrative embodiments may be implemented. In data processing system 300 running software, network 302 is a network, such as network 102 in FIG. 1. Server 304, client 306, and client 308 are connected to network 302. Server 304, client 306, and client 308 run operating system 310, operating system 312, and operating system 314, respectively. An operating system is software for managing hardware and software resources on a computing device, such as server 304, client 306, or client 308.

Each operating system in operating systems 310-314 runs programs. For example, operating system 312 has programs 316, 318, and 320 running in operating system 312. Each program in programs 316-320 executes software code. User 322 may create a program, such as program 316 in operating system 312. Each program in programs 316-320 may be a kernel, an operating system, a thread, or any application which executes software code.

When testing a software component, such as a process, testing all the software code in the software component is preferred. Software code in a software component frequently includes error recovery code. Error recovery code is software code which detects and responds to different error conditions which may arise during execution of the software code. Error recovery code is difficult to test, because many error conditions rarely occur and may be difficult to simulate. Therefore, the illustrative embodiments provide for a framework to allow conditional execution of specific code in an application, such as setting errors before executing error recovery code. Criteria in the framework and criteria in the application together determine whether the specific code in the application is executed.

The illustrative embodiments provide a computer implemented method, apparatus, and computer program product for returning a return code to an error hook in an application using a framework. A determination is made as to whether an identifier has an active status in response to receiving the identifier and a pass-through from the error hook. The error hook is software code in the application. The pass-through is a set of parameters. A do not execute return code is returned to the error hook in the application in response to a determination that the identifier does not have an active status. In another example, a set of framework conditions is retrieved using the identifier in response to a determination that the identifier has an active status.

In response to a determination that the set of framework conditions is not met, a do not execute return code is returned to the error hook in the application. In another example, if the set of framework conditions is met, an inject callback is retrieved using the error identifier. The inject callback is a block of code in the application.

In response to calling the inject callback with the error identifier and the pass-through, an inject callback return code is received. If the inject callback return code is the do not execute return code, the do not execute return code is returned to the error hook in the application. The do not execute return code is received by the error hook, a statement in the application associated with the do not execute return code is not executed.

In another embodiment, if the inject callback return code is an execute return code, the execute return code is returned to the error hook. In response to receiving the execute return code by the error hook, a statement in the application associated with the execute return code is executed. In response to executing the statement in the application, an error is injected in the application.

Figure 4:
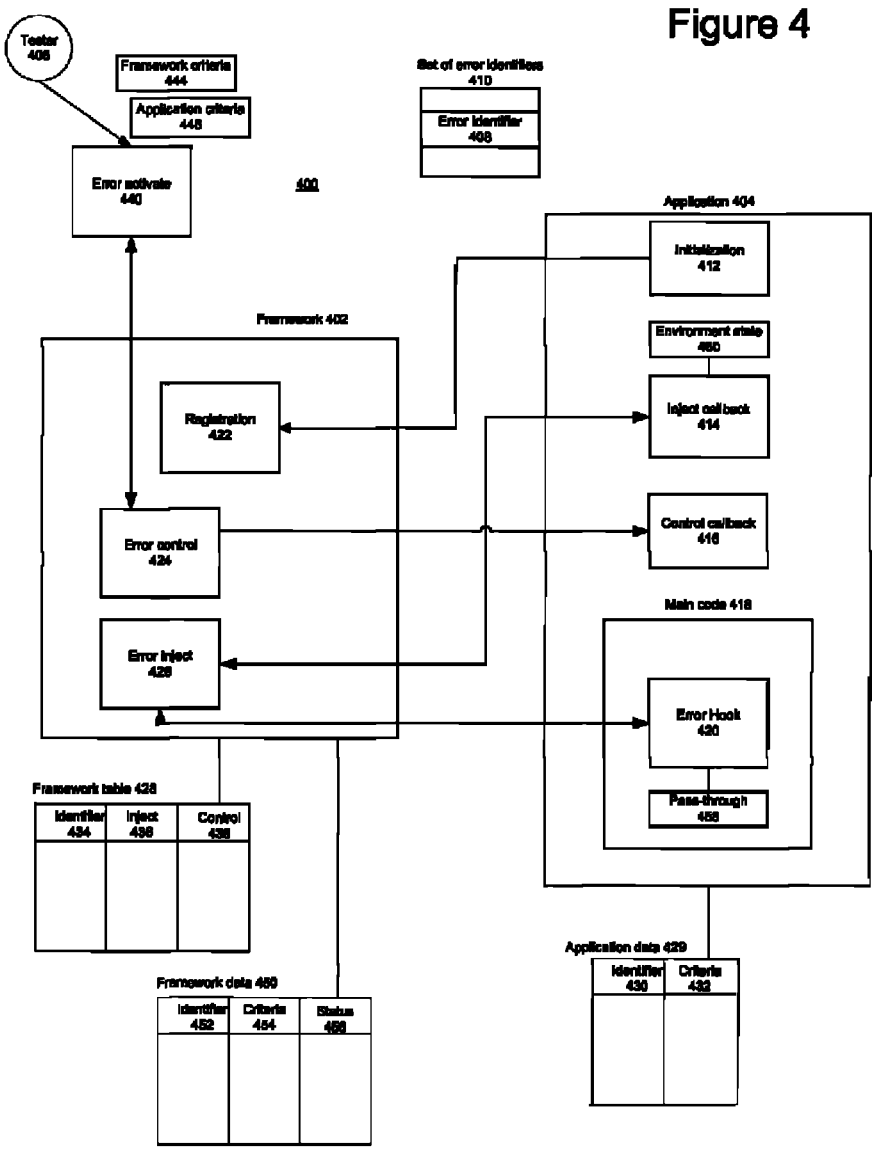
FIG. 4 is a block diagram of an error injection framework for injecting an error in accordance with an illustrative embodiment.

Turning now to FIG. 4, a block diagram of an error injection framework for injecting an error is shown in accordance with an illustrative embodiment. Data processing system 400 is implemented in any type of data processing system, without limitation, such as data processing system 100 in FIG. 1, data processing system 200 in FIG. 2, and/or data processing system 300 in FIG. 3. Data processing system 300 uses a framework to determine when an application should execute specific code in an application to inject an error. Those versed in the art will appreciate that the different components described in FIG. 4 may be used to perform conditional execution of a specific portion of application code, and the illustrative embodiments are not limited to injecting an error. Each of the blocks shown in FIG. 4, unless identified by some other structure, can be considered a means for performing the identified function or for implementing the identified object. Thus, for example, framework 402 is a means for implementing a framework, such as computer usable program code in a tangible computer usable medium, and tester 406 can be a means for testing, such as software or a data processing system for performing the functions of tester 406. Similar structures apply to the remaining identified reference numerals.

Data processing system 300 in FIG. 3 includes framework 402. Framework 402 is an error injection framework for injecting an error. Framework 402 is a program which executes software code, such as program 316 in FIG. 3. Application 404 is a program which executes software code, such as program 318 in FIG. 3. Tester 406 specifies framework criteria used by framework 402 for determining when an error should be injected. In this example, tester 406 is a program, such as program 318 in FIG. 3. In another embodiment, tester 406 is a user, such as user 322 in FIG. 3.

To inject an error in application 404, a software designer, such as user 322 in FIG. 3, manually obtains a unique error identifier, such as, error identifier 408, from set of error identifiers 410. Error identifier 408 is hard-coded into application 404 by the software developer. As used herein, hard-coded means the developer inserts error identifier 408 directly into the code. Error identifier 408 is manually allocated to allow tester 406 to specify framework criteria for error identifier 408. Additionally, the error identifier can be automatically inserted.

Application 404 contains several blocks. Each block is a portion of application 404 used to perform a specific function. In this example, four blocks of application 404 are shown, initialization 412, inject callback 414, control callback 416, and main code 418. Error hook 420 is a portion of software code within main code 418. Similarly, framework 402 contains several blocks. In this example, three blocks of framework 402 are shown; registration 422 error control 424 and error inject 426.

Main code 418 is the software code under test using framework 402. When error hook 420 is executed during the execution of main code 418, an error may be injected into main code 418. The decision to inject is made based on conditions specified by the software developer, and conditions specified by tester 406.

Initialization and Registration

Initialization 412 is executed to initialize application 404. Initialization 412 performs preparatory functions, such as initialing parameters in application 404. Initialization 412 initializes parameters in application 404 to create an environment for use by other blocks of application 404, such as main code 418.

As part of the preparatory functions performed by initialization 412, initialization 412 calls registration 422. Initialization 412 passes three parameters to registration 422, error identifier 408, inject callback 414, and control callback 416.

Registration 422 registers error identifier 408 with framework 402 by creating an entry in framework table 428. Each entry in framework table 428 has three fields. In this example, framework table 428 includes, but is not limited to, identifier 434 field, inject 436 field, and control 438 field. Error identifier 408 is stored in identifier 434, inject callback 414 is stored in inject 436, and control callback 416 is stored in control 438

Creating an entry in framework table 428 associates inject callback 414, and control callback 416 with error identifier 408. When an error identifier, such as error identifier 408, is placed in framework table 428, the error identifier is registered for use with framework 402. Any error identifiers not in framework table 428 are invalid for use with framework 402.

Activation Tester 406 calls error activate 440. If tester 406 is a user, tester 406 may invoke error activate 440 using an operating system command. If tester 406 is a process, tester 406 calls error activate 440 as a function call. Tester 406 supplies three parameters to error activate 440, error identifier 408, framework criteria 444, and application criteria 446. When error hook 420 is executed, a decision is made whether to inject an error in application 404. The decision to inject an error in application 404 is made by both framework 402 and control callback 416, using framework criteria 444 and application criteria 446, respectively. Both framework criteria 444, and application criteria 446 are a set of conditions which are met before an error is injected. As used herein, a set of conditions is one or more events that occur before or during another event. For example, framework criteria 444 may contain a set of conditions, such as, inject an error in the context of a specific thread or process, inject an error when executing on a given central processing unit, inject an error three times in every ten executions of error hook 420, inject five errors randomly, and inject ten errors randomly.

Error activate 440 passes three parameters to error control 424. In this example, the three parameters include, but are not limited to, error identifier 408, framework criteria 444, and application criteria 446. Error control 422 determines whether the error identifier passed by error activate 440 is registered by determining whether identifier 408 is in table 430. If error identifier 408 is not found in table 430, then error control 424 requests error activate 440 to notify tester 406 that the error identifier passed by error activate 440 is not valid.

If the error identifier, passed by error activate 440 to error control 424, is found in table 430, then the error identifier is valid. If the error identifier is valid, then error control 424 creates an entry in framework data 450. In this example, each entry in framework data 450 has three fields. For example, the three fields may be, without limitation, identifier 452, criteria 454, and status 456. Error control 424 stores error identifier 408 in identifier 452, stores framework criteria 444 in criteria 454, and sets status 456 to "valid". When the status field is "valid", the status field identifies that the error identifier has been stored in framework table 428, and in framework data 450. Error control 424 finds the entry in framework table 428 containing error identifier 408, and retrieves field control 438 containing control callback 416. Error control 424 calls control callback 416, and passes two parameters, error identifier 408, and application criteria 446. Control callback 416 receives the two parameters, and stores them in application data 429. Application data 429 is a table accessible to all the blocks of code in application 404. Each entry in application data 429 contains two fields, identifier 430, and criteria 432. Control callback 416 stores error identifier 408 in identifier 430, and application criteria 446 in criteria 432. Criteria 432 is used by inject callback 414 to determine whether an error should be injected. Error control 424 changes status 456 of the entry containing error identifier 408 in framework data 450 from "valid" to "active", identifying the error identifier in identifier 452 as active.

Injection

Main code 418 is tested using framework 402. Error hook 420 is a portion of software code in main code 418. Error hook 420 is executed during the execution of main code 418. Typically, error hook 420 is executed before error recovery code is executed in main code 418. When error hook 420 is executed, framework criteria 444, and application criteria 446 are used to determine whether to inject an error into main code 418.

When error hook 420 is executed, error hook 420 calls error inject 426, and passes two parameters, error identifier 408, and pass-through 458. Pass-through 458 are parameters specific to application 404. Pass-through 458 are parameters used by inject callback 414 to decide whether an error should be injected by error hook 420 into main code 418. Error inject 426 takes the two parameters, error identifier 408, and pass-through 458, and determines whether error identifier 408 is active by looking up error identifier 408 in framework data 450 and checking status 456. If error identifier 408 is not active then error inject 426 returns a return code to error hook 420 not to inject an error.

If status 456 in framework data 450 identifies error identifier 408 as active, then error inject 426 retrieves framework criteria 444 stored in criteria 454. Error inject 426 uses framework criteria 444 to determine whether to inject an error. For example if framework criteria 444 is a condition specifying that an error is injected three times, sequentially, then error inject 426 determines how many times an error has previously been injected for this specific call from error hook 420. Based on framework criteria 444, if error inject 426 determines an error should not be injected, then error inject 426 returns a return code to error hook 420 not to inject an error.

Based on framework criteria 444, if error inject 426 determines an error should be injected, then error inject 426 locates the entry in framework table 428 containing error identifier 408, and finds inject callback 414 in inject 436. Error inject 426 calls inject callback 414, and passes two parameters, error identifier 408, and pass-through 458.

In this embodiment, inject callback 414 uses error identifier 408 to find application criteria 446 in application data 429. Inject callback 414 uses application criteria 446, pass-through 458, and environment state 460 to determine whether the set of conditions in application criteria 446 are met. Application criteria 446 are a set of conditions specific to application 404. For example, application criteria 446 may specify device identifier to allow error injection only for a specific device. Pass-through 458 are parameters specific to application 404. Environment state 460 is a set of data items containing information about the current state of application 404.

If inject callback 414 determines the set of conditions in application criteria 446 are not met, then inject callback 414 informs error inject 426 not to inject an error, and error inject 426 informs error hook 420 not to inject an error. If inject callback 414 determines the set of conditions in application criteria 446 are met, then inject callback 414 informs error inject 426 to inject an error, and error inject 426 informs error hook 420 to inject an error. Thus, error hook 420, which originally called error inject 426, injects an error into main code 418 if error inject 426 informs error hook 420 to inject an error. Error hook 420 does not inject an error into main code 418 if error inject 426 informs error hook 420 not to inject an error. Error hook 420 thus controls the execution of main code 418.

Figure 5:
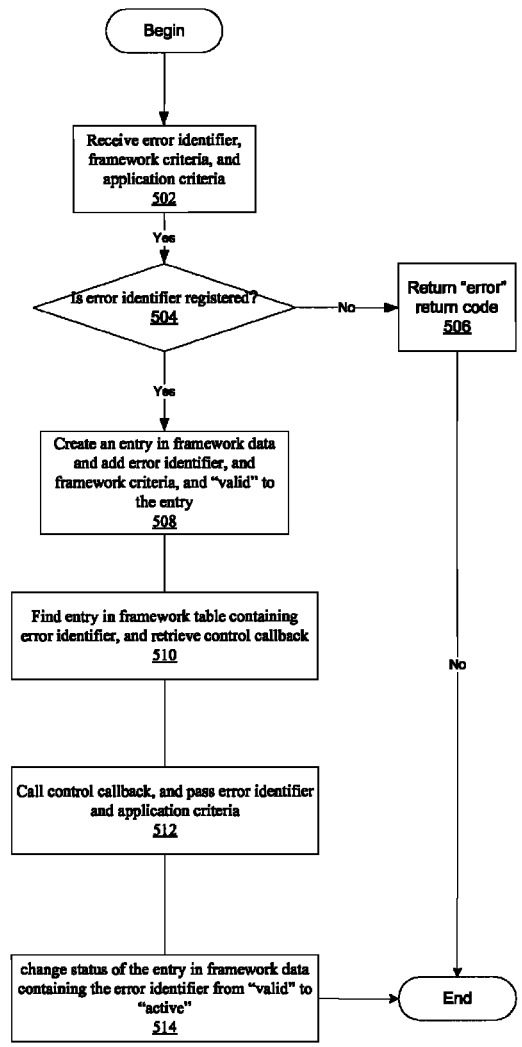
FIG. 5 is a flowchart for activating an injection point in accordance with an illustrative embodiment.

FIG. 5 is a flowchart for activating an injection point in accordance with an illustrative embodiment. The process in FIG. 5 is executed by a program for activating an injection point, such as framework 402 in FIG. 4. The process shown in FIG. 5 can be implemented in a data processing system, such as clients 104 and 106 or servers 110, 112, and 114 shown in FIG. 1 or in data processing system 200 shown in FIG. 2.

The process begins when an error identifier, framework criteria, and application criteria are received (step 502). The error identifier, framework criteria, and application criteria are received from a tester, such as tester 406 in FIG. 4, when the tester calls an activate function, such as error activate 440 in FIG. 4, and error activate 440 in turn calls error control 424. A determination is made as to whether the error identifier is registered by checking if the error identifier is in a table, such as error table 428 in FIG. 4 (step 504). If the answer in step 504 is "no", and the error identifier is not registered, an "error" return code is sent (step 506), and the process ends. If the answer in step 504 is "yes", and the error identifier is registered, then an entry is created in a table, such as framework data 450 in FIG. 4, the error identifier and framework criteria are added to the entry, and "valid" is added to the status field of the entry (step 508). The entry in a table, such as framework table 428 in FIG. 4, containing the error identifier is located, and control callback is retrieved from the entry (step 510). Control callback is called, and the error identifier and the application criteria are passed to control callback (step 512). The status of the entry in framework data containing the error identifier is changed from "valid" to "active" (step 514), and the process ends.

Referring now to FIG. 6, a flowchart illustrating the process for injecting is depicted in accordance with an illustrative embodiment. The process in FIG. 6 is executed by a program for injecting, such as framework 402 in FIG. 4. The process shown in FIG. 6 can be implemented in a data processing system, such as clients 104 and 106 or servers 110, 112, and 114 shown in FIG. 1 or in data processing system 200 shown in FIG. 2.

The process begins when an error identifier and a pass-through are received (step 602). Error identifier and the pass-through are sent by a block of code, such as error hook 420 in FIG. 4. A determination is made as to whether the error identifier is active by looking up the error identifier in the framework data, and checking the status field (step 604). If the answer in step 604 is "no", and the error identifier is not active, a "do not inject" return code is returned (step 606), and the process ends. If the answer in step 604 is "yes", and the error identifier is active, the error identifier is used to retrieve framework criteria from the framework data (step 608).

The framework criteria are used to determine whether to inject an error (step 610). If the answer in step 610 is "no", and framework criteria are not met and a "do not inject" return code is returned to error hook (step 612). If the answer in step 610 is "yes", because the framework criteria are met, the entry in the framework table containing the error identifier is used and the corresponding inject callback is retrieved (step 614). Inject callback is then called, and the error identifier, and the pass-through are passed as parameters to inject callback (step 616).

A return code is received from inject callback (step 618). A determination is made as to whether the received return code is an "inject" return code (step 620). If the answer in step 620 is "no", because the received return code is not an "inject" return code, then a "do not inject" return code is returned to error hook (step 622), and the process ends. If the answer in step 620 is "yes", because the received return code is an "inject" return code, then a "do not inject" return code is send to error hook (step 624), and the process ends.

Thus, the illustrative embodiments provide a computer implemented method, apparatus, and computer usable program code for returning a return code to an error hook in an application using a framework. Responsive to receiving an identifier and a pass-through from the error hook, determining if the identifier has an active status, wherein the error hook is software code in the application, and wherein the pass-through is a set of parameters. Responsive to a determination that the identifier has an active status, retrieving a set of framework conditions using the identifier. In response to a determination that the set of framework conditions is not met, returning a do not execute return code to the error hook in the application. In response to a determination that the set of framework conditions is met, retrieving an inject callback using the error identifier, wherein the inject callback is a block of code in the application. In response to calling the inject callback with the error identifier, and the pass-through, receiving an inject callback return code. In response to a determination that the inject callback return code is an execute return code, returning the execute return code to the error hook.

The illustrative embodiments also provide for a computer implemented method for testing a software application having a first subroutine for handling a first error that may occur during execution of the software application. A first code is inserted into the software application. The first code will cause the software application to return the first error upon execution of the software application. The software application is executed. The first error occurs during execution. A first error report is generated using the first subroutine. The first error report is stored in a memory.

The error injection framework provides a set of services for testing the software code in software components. Specific types of errors may be injected. Errors may be injected at specific points in the software code of the software component. Errors may be injected based on a variety of criteria, such as the identity of a process calling the software component, the identity of the central processing unit, and the specific context. Each error injection point may be individually enabled or disabled. Errors may be injected for a specified number of times, sequentially or randomly. For example, inject the error three times for every five executions of a specific software code segment.

As used herein, the following terms have the following definitions:

Exception—An abnormal event that disrupts normal kernel processing. This term includes user-mode exceptions and kernel errors.

Eyecatcher—A field in a structure used to identify the structure. Eyecatcher fields are set to a unique value that defines the memory block. Eyecatcher fields are typically the first field in the structure.

FRR—Failure Recovery Routine. These are component provided callback functions called by the recovery manager when an error occurs.

Recovery Manager (RM)—The collection of kernel functions that control error recovery processing.

RWA—Recovery Work Area. This is the structure passed to a recovery routine that contains information about the kernel error that initiated kernel recovery.

SUE—Special Uncorrectable Error. This is a memory ECC code that tags memory as corrupted. When the CPU attempts to load memory tagged with a SUE it receives a machine check.

The targeted error injection framework described herein provides a set of services (macros, routines, commands) to: (1) Define error injection points inside kernel extension or kernel components code, (2) define conditions for each error injection point that determine when the error is going to be injected, and (3) enable and disable individually each of these error injection points for testing specific error conditions. These error injection points are identified by "hooked" and "subhookid" in a way that is similar to the trace hooks supported by the AIX trace component.

Error injection hooks can be added to kernel and kernel extension code. Error injection hooks can be added to code that executes in thread context as well as code that runs in interrupt context. Thus, developers can define a specific action to be taken when an error is injected on a given error injection hook.

The framework described herein provides a way for test code to set up parameters for each error injection point that it uses to determine whether or not an error is injected when the error injection hook code is executed. The framework described herein can be limited to test for a set of basic conditions that are considered commonly used by error injection hooks. For instance, the framework can be limited to (1) inject only in the context of given threads or processes, (2) inject only in interrupt context on a given set of CPUs, (3) inject the error for only a specified number of times, either sequentially or randomly, and (4) inject an error a number of times out of every given number of executions of the error injection hook code. The framework also provides commands and interfaces for developers to support component specific conditions for injecting errors on a given error injection hook and perform specific actions when the hook code is executed.

Targeted error injection uses a formalized interaction with kernel code. Kernel code places error injection hooks into mainline code. Error injection hooks are much like a component trace hook. The error injection hooks are of the form:

void ERRINJ_HOOK(c_statement, errinjid_t errinj_id, . . . );

As used herein, the places in the code where developers declare that they wish to insert error injection code using the above macro are called "error injection points" or "error injection hooks." Error injection points are identified by a 64 bit error injection id (errinj_id). This errinj_id is a combination of a major hook id, in the upper 32 bits and a subhook id in the lower 32 bits.

Each kernel component typically has a small number of major hook ids reserved. For each major hook id, the kernel code can register one error injection function and one control function. The error injection function errinj_func( ) is called by the error injection iramework when an error injection hook corresponding to this major hook id is invoked. This function determines whether or not the error should be injected. The error injection function errinj_func( ) can be called in both thread and exception context.

The control function ctrl_func( ) is called by the error injection framework when a control action is performed on an error injection hook corresponding to the major hook id, such as enabling or disabling an error injection hook. The control function ctrl_func( ) can be called in thread context only.

A control API (application program interface) and corresponding command line interface, errinjctrl, is provided to enable or disable error injection hooks and provide hook specific filtering options to the framework or the registered control function. This control application program interface supports both a system call interface errinj_ctrl( ) for use by test programs and a kernel service errinj_kctrl( ) for use by kernel extensions and kernel components code. The application program interface and command are used, for instance, to tell the framework that a given error injection point should be activated only for a given thread. A kernel service, errinj_raise_except( ) is also provided by the error injection framework to allow the main line code to send a simulated exception to the first active failure recovery routine (FRR).

The Error Injection Framework's routines use the following basic type definitions: typedef unsigned int errhookid_t; typedef unsigned int errsubhookid_t; and typedef unsigned long errinjid_t. Each kernel component has one or a small number of major hook IDs allocated to it. In addition, for every major hook ID, it can associate minor hook IDs or subhook IDs. These two IDs are declared of type errhookid_t and errsubhookid_t respectively and defined as unsigned integers.

The error injection ID that identifies an error injection point in the code is a 64 bit unsigned type which is a combination of a major hook ID (also referred to in this document as hook ID) in the upper 32 bits and a subhook ID in the lower 32 bits. The first implementation supports a limited number of major hooks and subhooks. The hook IDs and subhook IDs are limited to the range [0 . . . 1023]. The interfaces described herein return an error if a hook or subhook ID value outside the supported range is passed as an argument.

Macros are provided by the error injection framework to manipulate IDs. An exemplary macro is as follows:

```
#define ERRINJ_ID_CREATE(hook_id,subhook_id)   \
    (errinjid_t)((hook_id<<32ULL) | (subhook_id &
0xFFFFFFFFULL))
#define ERRINJ_ID2HOOK(errinj_id)   (errhookid_t)(errinj_id >> 32)
#define ERRINJ_ID2SUBHOOK(errinj_id) (errhookid_t)(errinj_id &
0xFFFFFFFF)
```

Error injection points are inserted into kernel code using the macro ERRINJ_HOOK. An exemplary macro is defined as follows:

```
#define ERRINJ_HOOK(c_statement, errinjid, . . . )   \
    if ((const)error_inject_flag && errinj_hook(errinjid,
        __VA_ARGS__ )) { \
        __INFREQUENT;                   \
        c_statement;                    \
    }
```

The error injection macro performs a runtime check of the global flag error_inject_flag to determine if error injection is enabled. This global flag is set to 1 when at least one error injection point is enabled. When error injection is globally enabled, the macro calls errinj_hook( ) passing an errinj ID and variable arguments to the kernel service.

Note that the compiler _INFREQUENT execution pragma is utilized to minimize the mainline code executed in production environment. This macro uses a compiler extension allowing the rarely executed code to be stored outside the mainline.

The errinj_hook( ) kernel service quickly determines if an error injection event is pending for the errinjid. When an event is pending, a callout is made to the component registered error injection routine errinj_func( ). This routine can choose to not inject the error leaving the error event active until the next call. In this way, the code can be automatically inserted. If errinj_func( ) decides to inject the error, c_statement is executed. This can be inline code that injects the error or a function callout.

Conditions can be setup on a errinjid basis that errinj_hook( ) uses to determine whether the error injection event is pending, using the errinj_ctrl( ) system call or the errinj_kctrl( ) kernel service described below. Some of the conditions set through the control API for errinj_hook( ) are described as follows:

(1) Set a hard limit L to the total number of times the error is actually injected. When the limit is reached the error injection point is automatically disabled. This limit it applies to all the injection modes described below. (2) Inject the error only under specific thread or process context identified by thread IDs (tid) or a process IDs (pid). (3) Inject the error only when executing on certain cpus identified by their cpu IDs. (4) Inject only in interrupt context, only in thread context or both. (4) The three possible filters are AND'ed together. If a filtering parameter is not specified, the default is "any". So this allows for a wide range of conditions such as: (4a) Inject for thread A or B running on any cpu in thread context, (4b) Inject for any thread running on cpu n or m in interrupt context, and (4c) Inject for thread A running on cpu n in any context, and (5) Inject a number of times out of every second number times the other conditions are satisfied (P>N>=1). The injection mode could be sequential or random.

An exemplary test algorithm is presented below:

```
if (((pids and/or tids specified)&&(cur_pid/cur_tid != pid/tid)) ||
    ((cpu_ids specified) && (CPUID != cpu_id)) ||
    (injection_mode does not match current context))
        // no match, no injection
        Return(0);
// so far so good - Let's see what the registered routine
// has to say. Assume we're injecting (default when there's
// no registered function)
inj = TRUE;
if (errinj_func != NULL)
    inj = (*errinj_func(errinjid, arg1, . . . , arg7));
if (inj) {
    // We're ready to inject. Apply random/seq, N out of P
    // and limit conditions
    if (N and P are specified) {
        if (mode == random)
```

```
            inj = ((raschk_random( )%P) < N);
       else {
            // serial - inject if quota for series not met
            inj = ((++cur_cnt % P) <= N);
       }
       // Check total count against limit
       if ((L) && (++total_cnt > L))
            disable_errinj_point(errinjid);
  }
  // We're done return
  return(inj);
```

In the above code, the pid/tid or interrupt/cpu filtering is applied before calling the registered error injection routine. The limit L as well as the values N and P apply to the errors that are actually injected. The "N out of P" is close enough statistically, but is not guaranteed for each series of P actual injections in random mode. In the above code, "disabling" the error injection point can be accomplished by resetting the "enabled" bit in the subhook descriptor and optionally posting a message to a service thread to do the actual disable asynchronously.

An example of an implementation and use of the illustrative embodiments is provided below. In the following illustrative example, a call to xmalloc is performed. An exemplary existing code is as follows:

```
  If (buf = xmalloc(size, align, heap)) != NULL) {
       // Normal success case
  }
  else {
       // Error path - rarely taken
  }
```

If creation of an error injection point is desired to test the error path, the code will look something like this:

```
       buff = xmalloc(size, align, heap);
       ERRINJ_HOOK(xmfree(buf, heap);
            buff = NULL;,
            ERRINJ_ID_CREATE(12,105),
            arg0, arg1, arg2)
       If (buff != NULL) {
            // Normal success case
       }
       else {
            // Error path - rarely taken
       }
```

The code above creates an injection hook with a hookid of 12 and a subhookid of 105 (decimal). When this error injection point is enabled and an error is injected, the C statement in ERRINJ_HOOK( ) frees the buffer and reset the pointer to zero. In this case, the error path will then be executed every time an error is injected on this error injection hook.

This process works well in this example with xmalloc because the process is relatively easy to "undo" the xmalloc in order to simulate a failure without leaking the allocated memory. In other cases, where the function called has potentially dangerous side effects such as modifying shared kernel data structures or persistent storage, skipping the call altogether may be desirable when injecting an error. In this case, by using a flag that tells whether the error is being injected, the code could look like the following:

```
       error_injected = 0;
       ERRINJ_HOOK(buff = NULL;
            error_injected = 1;,
            ERRINJ_ID_CREATE(12,105),
            arg0, arg1, arg2)
       if (!error_injected)
            buf = xmalloc(size, align, heap);
       If (buf != NULL) {
            // Normal success case
       }
       else {
            // Error path - rarely taken
       }
```

This code achieves the goal that the routine is called only when not injecting an error. The drawback to this code is that this adds path length in the normal case, which is not always acceptable.

There are kernel services provided to register and unregister component error injection and control functions with the error injection framework on a major hook id basis. For example, the following definitions will be in <sys/errinj.h>:

```
#define EYEC_ERRINJ_REG    _EYEC8('e','r','r','h','k','r','e','g')
#define ERRINJ_REG_VER0    0x45520000   /* 'E' 'R' 0 0 */
struct errinj_reg {
       eye_catch8b_t eye_catcher;
       uint version;
       errhookid_t maj_hookid;   /* Major hook ID */
       kerrno_t (*errinj_func)(errinj_id_t errinjid, . . . );
       kerrno_t (*ctrl_func)(errinj_id_t errinjid, . . .);
       long reserved[4];
};
kerrno_t errinj_register(struct errinj_reg *buf);
kerrno_t errinj_unregister(errhookid_t maj_hookid);
```

These kernel services can be called in thread context. For registration, the functions are optional. A null pointer can be passed instead for one or both of the functions.

Registering major hooks with the targeted error injection framework is a prerequisite for initializing and enabling any error injection point. Thus, each major hook is registered with the framework, even if the component does not register any injection or control function.

The framework makes a copy of the data in the errinj_reg buffer, so the buffer can be reused (or freed) by the component when the errinj_register( ) call returns. If registered, errinj_func( ) is called by errinj_hook( ) (invoked by macro ERRINJ_HOOK) when error injection is pending on a subhook of the hookid. It is passed the errinjid (64 bit hook/subhook) and up to 7 parameters passed by the mainline code thru the macro. It should return a non zero value only if it decides to inject an error so that the c_statement passed to ERRINJ_HOOK can be executed.

If no function has been provided, the error injection framework assumed that injecting the error is permissible, and returns 1. This action has the exact same effect as registering an empty function that always returns 1. If registered, ctrl_func( ) is called by the error injection framework when a control function is executed on one of the subhooks of hook_id by errinj_ctrl). It is called with the following set of parameters (see details below in the section describing the errinj_ctrl( ) system call):
rc=ctrl_func(errinj_id_t errinj_id, ctrl_op_t operation, void *addr, int *size);

In particular, this function gets called when the error injection point is disabled, either by a direct call to errinj_ctrl( ) or when the major hook ID is unregistered, which will automatically disable all the subhook ids still enabled. This action should allow the control function to release all the data associated with an error injection point. Note that registering major hook id that is already registered is an error.

The Error Injection Framework provides a kernel service to send a simulated exception to the first active failure recovery routine (FRR). For example,
kerrno_t errinj_raise_except(ei_rwa_except_t *except)

The caller describes the exception in the ei_rwa_except structure passed as an argument as follows:

```
struct ei_rwa_except {
    except_code_t ei_rwa_except_code;   /* exception code */
    unsigned long ei_rwa_except_detail[5]; /* exception detail */
};
typedef struct ei_rwa_except ei_rwa_except_t;
```

This function allows for simulation of any kind of exception. It uses a special trap to generate the exception which is then delivered to the failure recovery routine by the recovery manager.

For a simulated exception, all the values in the exception details area are supplied by the caller as part of the ei_rwa_except structure and is passed as is to the failure recovery routine. The most common envisioned use of this kernel service is for the kernel code to insert a call to errinj_raise_except( ) as part of the C statement in the ERRINJ_HOOK macro. This way, the simulated exception will be sent when the error injection framework and the registered error injection function decide that error should be injected.

The system call errinj_ctrl( ) and the kernel service errinj_kctrl( ) are provided by the error injection framework to perform control actions on an errinj_id basis. The major hook ID corresponding to the error injection point were previously registered. The action is specified by a command, as shown in the following example:

```
#include <sys/errinj_ctrl.h>
int errinj_ctrl(errinj_ctrl_command_t command,
        errinj_id_t errinj_id,
        long    arg1,
        long    arg2);
kerrno_t errinj_kctrl(errinj_ctrl_command_t command,
        errinj_id_t errinj_id,
        long    arg1,
        long    arg2);
```

For both the system call and the kernel services, one difference between the system call and the kernel service are that the system call uses copyin/copyout while the kernel service of course does not. In addition, the system call is restricted to root users while the kernel service is not.

The illustrative error injection framework includes a number of supported commands. One example of a supported command is the EI_HOOK_CREATE command. This command creates an error injection point (specified hookid and subhookid). This command makes the injection point known to the framework. Then its status and/or parameters can be modified using the other commands. The default for the filtering options after a EI_HOOK_CREATE command are: (1) Injection in both thread and interrupt context, (2) no thread/process id and no cpu id filtering, (3) mode sequential with no repeat count and period, i.e. injects every time the hook is executed, and (4) a limit of 1 on the number of injections Another command is EI_HOOK_ENABLE. This command Enables a set of error injection points.

Another command is EI_HOOK_QUERY_LIST. This command queries and returns the status of a set of registered error injection points.

Another command is EI_HOOK_QUERY_PROPERTIES. This command queries the control parameters for a set of registered error injection points.

Another command is EI_HOOK_PASSTHRU. This command passes data directly to the registered control functions for a set of injection points.

Another command is EI_HOOK_DISABLE. This command Disable a set of error injection points and resets the filtering parameters to their default values (as they were after EI_HOOK_CREATE).

Another command is EI_HOOK_DELETE. This command Deletes a set of error injection points. After deletion, the error injection points are no longer known by the framework (i.e. they cannot be retrieved by the EI_HOOK_QUERY_LIST command).

For all the commands described above, the registered control function ctrl_func( ) is called. The arguments passed to this function for each command are described below.

The following commands are used to set or change the filtering parameters of a set of error injection points. These parameters have been described briefly in a previous section.
  EI_HOOK_SET_PID_TID
  EI_HOOK_SET_LIMIT
  EI_HOOK_SET_REPEAT
  EI_HOOK_SET_MODE
  EI_HOOK_SET_CPUS These commands can be used when the target subhooks are not enabled. Thus, the normal sequence of operation on an error injection point is:
  1. EI_HOOK_CREATE
  2. Set parameters using some of the commands above
  3. EI_HOOK_ENABLE To change the parameters, disable the error injection point (EI_HOOK_DISABLE) and then reprogram the hook using the *_SET_* commands and re-enable the hook. As mentioned above, disabling the hook resets all filtering parameters to their default value. Note that the registered control function ctrl_func( ) is not called for the *_SET_* commands.

The error injection points are selected using the errinj_id parameter. Some of the commands can operate on a set of error injection points. The illustrative interface supports the following: (1) Apply the command to a specific error injection point defined by a hook_id and a subhook_id, (2) Apply the command to all the subhooks associated with a specific hook_id, and (3) Apply the command to all error injection points (all subhooks of all hook_ids). The combination of "all hookids" with a specific subhookid is invalid.

The definitions below help generate the correct errinjid_t value:

```
#define EI_ALL_HOOKS      ((errhookid_t)0xffffffff)
#define EI_ALL_SUBHOOKS   ((errsubhookid_t)0xffffffff)
```

For instance a HOOK_QUERY_LIST command can apply (1) to a specific major hook/subhook, such as errinj_id=ERRINJ_ID_CREATE(0x12, 0x34); (2) to all subhooks of a given major hook, such as errinj_id=ERRINJ_ID_CREATE (0x12, EI_ALL_SUBHOOKS); and/or (3) to all hooks and subhooks, such as errinj_id=ERRINJ_ID_CREATE (EI_ALL_HOOKS, EI_ALL_SUBHOOKS);

EI_HOOK_QUERY_LIST is allows specification of EI_ALL_HOOKS (with EI_ALL_SUBHOOKS of course). This enables the errinjctrl command using the application program interface to display a list of all the error injection points currently known by the framework and whether they are enabled or disabled.

EI_HOOK_QUERY_PROPERTIES and EI_HOOK_CREATE accept a specific error injection point as a parameter.

All the other commands accept either a specific error injection point or a specific major hook id (and EI_ALL_SUBHOOKS) in which case they apply to all the subhooks. When EI_ALL_SUBHOOKS is used as part of the errinj_id argument, the system call code retrieves all the target error injection IDs (subhooks) and applies the command to each of them. In particular, the registered control function associated with an error injection point is always called for only one specific error injection ID. This means that errinj_ctrl( ) calls the registered control function once for each subhook of each hook that belongs to the list.

The values passed as arguments through arg1 and arg2 depend on the command. Exemplary arguments are described below.

For the commands EI_HOOK_CREATE, EI_HOOK_ENABLE, EI_HOOK_DISABLE and EI_HOOK_DELETE the errinj_ctrl and errinj_kctrl services do not use the extra arguments arg1 and arg2. Both are ignored by the service.

For the command EI_HOOK_SET_LIMIT, the framework expects the value of the limit to be passed as arg1. A rg2 is ignored.

For the command EI_HOOK_SET_REPEAT the services expect the value of the repeat count in arg1 and the value of the repeat period in arg2. The two values are respectively the N and P values described earlier for the "inject N times out of every P occurrences of the hook" filter.

For the command EI_HOOK_SET_MODE the services expect a bit mask representing the mode in arg1. Arg2 is ignored. The mode specifies whether the injections are sequential (default) or random and whether to inject in thread context, interrupt context or both (default). Thus, the mode is specified using 3 flags: EI_HOOK_MODE_RANDOM, EI_HOOK_MODE_THREAD_ONLY and EI_HOOK_MODE_INTR_ONLY. The last 2 being exclusive. Random mode will be ignored if the repeat parameters (count and period) are not specified.

For the command EI_HOOK_SET_PID_TID, the services expect arg1 and arg2 to be respectively the address and size of a buffer containing a list of 64 bit pids and/or tids. The size should then be 8*N where N is the number of pids and tids in the list. The framework identifies pids or tids based on the AIX convention that pids are even numbers and tids are odd numbers. The list can have both pids and tids. Due to storage limitations, the framework keeps only up to eight pids and tids.

The command EI_HOOK_SET_CPUS expects arg1 and arg2 to be respectively the address and size of a buffer containing a list of 16 bit short integers (cpuid_t) each representing a logical cpu id. The framework allows a maximum of sixteen cpus to be specified. The size should be set to 2*N where N is the number of cpu ids specified in the list.

The command EI_HOOK_PASSTHRU provides a way for the caller to pass an argument buffer directly to the registered control function. For this command the services expect arg1 and arg2 to be respectively the address and size of a buffer. The only processing done by the system call is to copy the buffer contents from user to kernel space. Then the system call passes the command and errinj_id to the registered control function together with the address and the size of the kernel buffer.

There are two query commands. These commands use the buffer to return the results of the query. The first query command is EI_HOOK_QUERY_LIST. This command returns a list of the error injection points corresponding to the errinj_id value passed as an argument. The list contains only those error injection points that are known to the framework, i.e. those that have been previously created using the EI_HOOK_CREATE command and have not been deleted. This command can return a potentially long list of error injection points using a compact format described below. The second query command is the EI_HOOK_QUERY_PROPERTIES. This command returns the properties of a given error injection point such as status, error injection and control functions, filtering information and possibly other data provided by the registered control function.

For the query commands, the framework expects arg1 to be the address of a buffer and arg2 to be a pointer to an integer containing the size of the buffer. This buffer is used by the framework to copy the data retrieved by the query commands. The framework updates the integer pointed to by arg2 with the actual size of the data retrieved.

The intended use for this particular sub example is for a caller who needs to know all the error injection points associated with a major hook ID, for instance to query a list using EI_HOOK_QUERY_LIST. The caller then has the option of querying the properties of some or all of the injection point in the list if he so wishes.

The command EI_HOOK_QUERY_LIST returns an array of 64 bit unsigned integers, each containing an errinj_id. The system call takes advantage of the fact that there are only a limited number of major hook ids and encodes the status (enabled/disabled) on the high order bit (value 1 means enabled). If the array provided by the user is too small to contain all the erinj_ids, the framework copies whatever data fits in the user buffer, starting at the beginning of the list, and returns a positive (non zero) return code to indicate that the data was truncated. The registered control function is not called for this command.

The command EI_HOOK_QUERY_PROPERTIES returns a structure containing the information the system and possibly the control function has for a given errinj_id. This command does not accept errinj_id specifications using ALL_HOOKS/ALL_SUBHOOKS.

The properties are a combination of the data attached to the major hook-id and the error injection point and are formatted as follows:

```
Struct ei_hook_query_prop {
    Struct ei_hook_descr {
        void *errinj_func;
        char errinj_func_name[64];   /* symbolic name */
        void *ctrl_func;
        char ctrl_func_name[64];      /* symbolic name */
    } ei_hook_data;
    struct ei_subhook_descr {
        int subhook_state;
        int subhook_mode;
        int subhook_pid_tid_count;
        int subhook_cpus_count;
        ulong subhook_pid_tid[8];
        uint subhook_cpus[16];
        int subhook_max_activations;
        int subhook_repeat_number;
        int subhook_repeat_period;
        int subhook_inject_total;
```

```
    } ei_subhook_data;
    long long    subhook_user_data[1];   /* start of hook/subhook
                                            user data */
};
```

Using the address of the function descriptor, errinj_ctrl( ) tries to retrieve the function symbolic name using raschk_addr2sym). For this command, errinj_ctrl( ) calls the registered control function with the address of the user_data array and the address of an integer containing the size available in the buffer. It expects the registered function to modify the size parameter to reflect the actual size of the user data. Errinj_ctrl( ) sets the size parameter to the actual length of the data in bytes before returning to the user for both query functions.

Seen from the framework, the registered function errinj_func( ) is called with the errinjid of the error injection point being executed and a variable number of arguments whose type and number is known only by the component and the registered function. These variable arguments are passed to errinj_hook( ) by the component through the ERRINJ_HOOK( ) macro and passed as is to errinj_func( ) So, for the framework, the registered function prototype looks like this:
    kermo_t errinj_func(errinjid_t errinjid, . . . )

In fact, because the framework does not know even how many arguments there were, errinj_hook( ) calls errinj_func( ) with 8 arguments: the errinjid and 7 variable arguments. The registered function will use only the arguments it knows about, that should have been passed to ERRINJ_HOOK). The number 8 for the limit on the number of arguments is the maximum number of arguments that the C compiler passes in registers when calling a function.

This function should return a positive value when an error should be injected, 0 when an error should not be injected and a negative value to indicate an error. In the latter case, the framework will log the error (LMT trace), disable the error injection point, and not inject the error.

If error injection points for a given major hook id are placed in kernel code that can be executed in interrupt context, the registered errinj_func( ) will be called in interrupt context. In this case, the usual limitations for interrupt level code apply to the registered errinj_func). In addition to this feature, limiting the number of kernel services used by errinj_func( ) is preferred so as to minimize the risks of interactions when error injection hooks are enabled in more than one component simultaneously.

The Error Injection Framework does not hold locks across callouts to either of the registered functions. The registered control function ctrl_func( ) is called by the framework with 4 arguments:
    kermo_t ctrl_func(errinjid_t errinjid, ctrl_op_t operation, void *buf, int *size);

The function is called in thread context (not interrupt context). The table below shows the operations during which the control function is called and what the parameter values are.

| Operation | Called by | errinjid | buf | Size |
|---|---|---|---|---|
| ERRINJ_OP_REGISTER | errinj_register( ) | hookid, ALL_SUBHOOKS | NULL | NULL |
| ERRINJ_OP_UNREGISTER | errinj_unregister( ) | hookid, ALL_SUBHOOKS | NULL | NULL |
| ERRINJ_OP_CREATE | errinj_ctrl( )-EI_HOOK_CREATE | hookid, subhookid | NULL | NULL |
| ERRINJ_OP_DELETE | errinj_ctrl( )-EI_HOOK_DELETE | hookid, subhookid | NULL | NULL |
| ERRINJ_OP_ENABLE | errinj_ctrl( )-EI_HOOK_ENABLE | hookid, subhookid | NULL | NULL |
| ERRINJ_OP_DISABLE | errinj_ctrl( )-EI_HOOK_DISABLE | hookid, subhookid | NULL | NULL |
| ERRINJ_OP_PASSTHRU | errinj_ctrl( )-EI_HOOK_PASSTHRU | hookid, subhookid | address | &size |
| ERRINJ_OP_QUERY | errinj_ctrl( )-EI_HOOK_QUERY_PROP | hookid, subhookid | address | &size |

For ERRINJ_OP_REGISTER and ERRINJ_OP_UNREGISTER, the hookid part of the errinjid is significant since the register/unregister is done per major error injection hook. For ERRINJ_OP_QUERY, the framework expects the registered control function to update the size with the actual number of bytes copied into the buffer. The case where data is passed to the registered control function is when errinj_ctrl( ) (or errinj_kctrl( )) is called with the command EI_HOOK_PASSTHRU. In this case, also, the value returned by the function to the framework is returned to whoever called errinj_ctrl( )/errinj_kctrl( ). For all the other operations, the return code is ignored by the framework.

The syntax of the error injection framework commands is as follows:
errinjctrl command [keyword=<value>[keyword=<value> . . . ]]

The following commands are supported: (1) create "creates" an error injection point; (2) "enable" enables and initialize a set of error injection points; (3) "disable" disables a set of error injection points; (4) "set" sets the value of parameters for a set of error injection points; (5) "list" provides a short listing of a set of error injection points; (6) "query" provides a display properties of a set of error injection points; (7) "passthru" passes a command string to control function(s) associated with a set of error injection points; (8) "delete" deletes an error injection point. The error injection framework also supports keywords.

The error injection framework also supports a number of keywords. An exemplary keyword is "errinjid". This keyword identifies a set of target error injection points. An error injection point is identified by a major hook id and a subhook id. The format for the value associated for this keyword is as follows:
<hookid>:<subhookid>[,<hookid>:<subhookid>, . . . ]

The terms hookid and subhookid are either decimal numbers or hexadecimal numbers starting with "0x". The symbolic value "all" can also be used for either hookid, subhookid or both. Only the list and query commands may support the specification of all hookids and all subhookids. This keyword is mandatory for all commands, except list, for which its absence will be taken as "list all registered injection points". This keyword can be repeated, in which case, every occurrence adds to the current list of error injection points.

Another exemplary keyword is "id". This keyword defines a list of process and/or thread ids used for filtering by the error injection framework. The error injection points it applies to will be activated only when the injection happens in process/thread context (i.e. not interrupt environment) and the current process or thread is part of the list. The associated value is a comma separated list of decimal numbers and/or hexadecimal numbers starting with "0x". This keyword can be repeated, in which case, every occurrence adds to the list of pids and tids to be passed down to the framework. However, the framework in this illustrative embodiment supports eight pids and tids for a given error injection point and the command will fail with an error message if the limit is exceeded. This keyword is valid only if the command is "set".

Another exemplary keyword is "cpu". This keyword defines a list of logical cpu numbers on which the error will be injected when the error injection point is executed in interrupt context. The value is a comma separated list of decimal numbers and/or hexadecimal numbers starting with "0x". This keyword can be repeated, in which case, every occurrence adds to the list of cpuids to be passed down to the framework. However, keep in mind that the framework supports only up to sixteen cpuids for a given error injection point and the command will fail with an error message if the limit is exceeded. This keyword is valid only if the command is "set".

Another exemplary keyword is "limit". This keyword defines the maximum number of times that a set of error injection points will be activated before being automatically disabled. The associated value is a positive decimal number smaller than or equal to 2147483647 in one illustrative example. By default if limit is not specified, the error injection framework assumes a limit of 1 on the number of activations. This keyword is valid only with the "set" command and cannot be repeated in this illustrative example.

Another exemplary keyword is "mode". This keyword defines the error injection activation mode. The possible values are seq, rand, thronly, intronly, thrintrboth. This instructs the framework that a given error injection point should be activated every time it is hit (seq) or randomly (rand), and whether injections happen in thread context only, in interrupt context only or both. seq and rand are mutually exclusive and thronly, intronly and thrintrboth are mutually exclusive. The value is a comma separated list (2 elements max, due to exclusions mentioned above). This keyword is valid only if the command is "set". Alternatively, the keyword can be repeated twice) to provide a set of 2 values.

Another exemplary keyword is "repeat". This keyword defines how often a given error injection point should be activated. The format of this keyword is"
repeat=<count>,<period>

The terms count and period are numbers (positive, decimal or hexadecimal starting with 0x). The term period is greater than count. For instance "repeat=3,20" instructs the framework that the error is to be activated 3 times out of every 20 times the error injection point is reached. The 3 out of 20 activations are either sequential or random depending on the mode. This keyword is valid only with the "set" command and cannot be repeated.

Some rules can be applied to the above commands and keywords in some illustrative embodiments. The keyword errinjid is mandatory for all commands except list for which its absence is interpreted as "list all registered injection points". The keywords id, cpu, limit, mode and frequency are valid only with command set. If the command is passthru, the errinjid keyword must be present. The rest of the command line is passed directly to the control function(s) registered to the target error injection points in ASCII format. The keyword errinjctrl uses the system call errinj_ctrl to control the state and parameters of error injection points. Thus, this keyword has the same restrictions as the programming interface. In particular, the subcommand set which uses the subcommands EI_HOOK_SET_* of the system call only work if the target error injection point is disabled, and disabling an error injection point using the subcommand disable reset all the error injection parameters and they need to be re-set before re-enabling the error injection point.

The output for subcommands list and query could looks like this:

```
# errinjctrl list
Currently enabled error injection points:
hooks  subooks
-----  ----------------------------------------------
0001:  0002 0003 0014 0035 0066 00123 00189 0512 0667 0890
       0934 1016
0003:  0023 0123 0456
0036:  0001 0002 0003 0016

# errinjctrl query errinjid=3:123
Hook  errinj_func  ctrl_func  #subhooks
----  -----------  ---------  ---------
0003  comp_err_func  none        3
     subhook Context pids/tids cpuids limit repeat period mode
#injections
     -------  -------  ---------  -------  -----  ------  ------  ----  -----------
     0123  THRONLY  234789   any   1024   20   100  rand  57
        256728
     subhook additional data
     ----------------------
00000003 F1000030 0082FD38 8003722E   ...ñ...0...ý8...r.
  00000034 454F4400              ...4EOD.

```

If the symbolic name for the function cannot be found, errinjctrl displays the address of the function descriptor in hexadecimal starting with "0x". The format for the additional data returned by the registered control function is unknown. Requesting from the control functions that they return ASCII strings in the HOOK_QUERY_PROPERTIES buffer is usually not practical, because errinjctrl is only one of the consumers for this information. The FVT testcases, for instance, using the application program interface might know what the data format is and binary data might make better sense for them. The KDB style format with the binary followed by the ASCII translation seems to be best suited for this data.

The error injection framework does not have any extra RAS features. Because it is an internal test tool, it can perform minimal runtime error checking, such as parameter checking, does not need specific component dump capabilities, and does not need protection keys. The error injection framework need not implement any recovery.

The framework will use LMT trace hooks for the injection path. The traces will be saved in the "rare" buffer. The framework's data structures being allocated in the kernel heaps and being pinned in memory will be part of standard system dumps. This feature and is enough for debugging problems due to bugs in the framework itself.

In the illustrative embodiments described herein, a limited number of major hooks are typically allocated. For each major hook, a limited number of subhooks are allocated. This design plans on managing the error injection point data as arrays and using the major hook id and subhook ids as indexes in their respective arrays. This design therefore will set limits on the number of hooks and subhooks that are allowed in order to keep memory usage reasonable.

The basic data structures are the major hook descriptor which contain the addresses of the registered error injection and control function descriptors, and the subhook descriptor which contains the status and control information for the error injection point. A description of these data structures is provided below.

```
struct hook_descr {
    eye_catch8b_t hk_eyec;
#define EYEC_ERRINJ_HOOK _EYEC8('H','O','O','K','d','e','s','c')
            /* Number of enabled subhooks */
    void *errinj_func;
    void *ctrl_func;
        int sbhk_count[8];
        struct subhook_descr *sbhk_ptr[8]; /* Array of pointers to *
                         * subhook descriptors */
        Simple_lock hk_lock;
};
```

The error injection framework supports 1024 major hooks. The major hook descriptor table is allocated and pinned when the first major hook is registered with the framework using errinj_register( ). The table amounts to 128 KB, so this should not be a problem. If deemed necessary, it is possible to delay the pinning until at least one subhook gets created by adding a global count.

The hook descriptor keeps in sbhk_ptr a list of 8 subhook array pointers. This feature allows allocating the subhook array by chunks of 128 descriptors as needed instead of allocating an array of 1024 for each hook descriptor that has a least one subhook created. Based on the assumption that most major hooks will have far less than 1024 subhooks defined, this assumption will save the allocation of a significant amount of pinned storage for the subhooks.

With this design the major hook id (0-1023) is a direct index into the hook_descriptor array. The subhook id is also limited to the range between 0 and 1023. From these 10 bits, the upper 3 are used as an index into the hook descriptor's array of pointers to retrieve the address of the corresponding array of 128 subhook descriptors, and the lower 7 are used as an index into this array of subhook descriptors. The framework keeps in sbhk_count a count of existing subhooks for each array of 128 subhook descriptors. The memory allocated for a chunk of 128 subhook descriptors is freed when the count goes to zero (last subhook in the chunk deleted).

The simple lock hk_lock is used to serialize the errinj_ctrl( ) operations such as enable, disable, set, etc. This lock is not taken on the error injection path (see section on locking below).

```
struct subhook_descr {
    eye_catcher4b_t sbhk_eyec;
#define EYEC_ERRINJ_SUBHOOK     _EYEC4('S','U','B','H')
    int flags;
#define SBHK_ENABLED    1
#define SBHK_THRONLY    2
#define SBHK_INTRONLY   4
#define SBHK_RAND       8
    ulong pid_tid[8];    /* pid or tid for filtering  */
    ushort cpuid[16]
    uint  limit;  /* maximum number of activations */
    uint  count;  /* req'ed number of activations */
    uint  period; /* per every period executions  */
    uint  total_cnt; /* current total activation count */
    uint  cur_cnt;       /* Number of executions in the period */
        uint    reserved;
};
```

The structure size is 128 bytes. An array of 128 subhook descriptors is allocated and pinned when the first subhook in the corresponding chunk of 128 subhook descriptors for a major hook is enabled. The array is unpinned and freed when the last subhook in the chunk is deleted. The count of enabled subhooks for a major hook is kept in the hook descriptor.

The design assumes that the hook and subhook ids can be used as indexes into arrays, so they should be allocated carefully. The hooks and subhooks are defined in the header file <sys/errinjid.h>.

Simple locks can be used to synchronize registration, unregistration, creation, deletion, enablement, disablement of hooks in the errinj_ctrl( )/errinj_kctrl( ) code path at base level. In one illustrative example, a global lock is provided for the major hook table and one lock per major hook for subhook operation.

Because the errinj_hook( ) path can be taken both in thread and interrupt context, it is sometimes impractical to use the simple locks to synchronize with this code path. This code will use atomically incremented/decremented use counts to prevent modifications by the hook control path that could cause problems in the injection path.

Synchronization need not be attempted for concurrent executions of the error injection path, as this should not be a problem. The fields modified in the injection path are counts that will be updated through atomic operations.

An illustrative example of synchronization is presented below. Suppose that a pointer exists to a data structure and a use count is associated with the pointer. The data structure has been allocated and initialized and is used by the error injection path. Here is the code the error injection path would execute:

```
if (ptr == NULL)
    Return(FALSE);
fetch_and_add(count, 1);
if (ptr != NULL) {
    /*
     * Do what we have to do with data structure
     */
    rc = TRUE;
}
else
    rc = FALSE;
fetch_and_add(count -1);
return(rc);
```

Here is what the control path seeking to delete and free the data structure would do:

```
local_ptr = ptr;        /* save value in local variable */
ptr = NULL;
sync( );                /* make sure others see the change */
while(count != 0)
    sleep(1); /* for instance */
free(local_ptr);
```

Because the error injection path above does not increment the use count when pointer is NULL, there is no risk that a high rate of injections will unduly delay the control path. The implementation will do its best to minimize the number of use counts that have to be incremented/decremented on the error injection path. The memory allocated for the subhooks will not be freed until the parent major hook is unregistered, at which time the subsystem should have been quiesced. This should allow most of the injection path to work with minimal synchronization through use counts.

The error injection framework described herein can use the following kernel services. In the error injection path (ERR-INJ_HOOK): atomic operations (fetch_and_add) and rasch-k_random. The control path will use xmalloc/xmfree and simple_lock/simple_unlock, assuming that the memory is allocated from the pinned heap. Otherwise, it will also use pin/unpin services. To avoid surprises, the registered functions can be restricted to the same set of kernel services: Atomic operations for errinj_func, Xmalloc/xmfree, and simple_lock/unlock for ctrl_func.

The flowchart and block diagrams in the figures illustrate the architecture, functionality, and operation of some possible implementations of systems, methods and computer program products according to various embodiments. In this regard, each block in the flowchart or block diagrams may represent a module, segment or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for testing a software application having a first subroutine for handling a first error that may occur during execution of the software application, the computer implemented method comprising:
    associating a first code with the software application, wherein the first code is configured to cause the software application to conditionally process the first error upon execution of the software application based upon application criteria comprising a set of conditions specific to the software application, framework criteria comprising a set of conditions regarding when an error is to be processed, and an environment state comprising information about a current state of the software application, and wherein the first code further comprises:
        instructions, responsive to receiving an error identifier, the framework criteria, and the application criteria, to determine whether the error identifier is registered;
        instructions, upon a determination that the error identifier is registered, to store the error identifier, the framework criteria, and a valid status;
        instructions to retrieve a control callback using the error identifier, wherein the control callback is a software procedure in the software application;
        instructions to call the control callback with the error identifier and the application criteria as parameters; and
        instructions to change the valid status to an active status;
    executing the software application, wherein the software application invokes the first code and identifies the application criteria to the first code, and wherein the first error occurs during execution of the software application;
    generating a first error report using the first subroutine; and
    storing the first error report in a memory.

2. The computer implemented method of claim 1 wherein the first error report describes the first error in a manner suitable for human interpretation.

3. The computer implemented method of claim 1 further comprising:
    modifying a first parameter of the first code, wherein modifying the first parameter of the first code changes a first aspect of the first error.

4. The computer implemented method of claim 3 wherein the first aspect of the first error specifies a number of times that the first error is to be processed upon a plurality of separate executions of the software application.

5. The computer implemented method of claim 1 wherein the first code further comprises:
    instructions to receive, by an error hook, a do not execute return code, wherein a statement in the software application associated with the do not execute return code is not executed.

6. The computer implemented method of claim 5 wherein the first code further comprises:

instructions, responsive to receiving an execute return code by the error hook, to execute the statement in the software application.

7. The computer implemented method of claim 6 wherein the first code further comprises:

instructions, responsive to executing the statement in the software application, to inject an error into the software application.

8. The computer implemented method of claim 1 wherein the instructions to determine whether the error identifier is registered further comprises:

instructions to receive the error identifier, an inject callback, and a control callback from the software application; and instructions to store the error identifier, the inject callback, and the control callback in a framework database, wherein storing the error identifier in the framework database identifies the error identifier as having an active status.

9. The computer implemented method of claim 1 wherein the first code further comprises:

instructions, responsive to a determination that the error identifier does not have an active status, to return a do not execute return code to an error hook in the software application;

instructions, responsive to a determination that the framework criteria is not met, to return a do not execute return code to the error hook in the software application; and instructions, responsive to a determination that an inject callback return code is the do not execute return code, to return the do not execute return code to the error hook in the software application.

10. A computer program product comprising a non-transitory computer-usable storage medium having program code stored thereon that is configured to perform, when executed by a data processor, steps of:

associating a first code with a software application, wherein the first code is configured to cause the software application to conditionally process a first error upon execution of the software application based upon application criteria comprising a set of conditions specific to the software application, framework criteria comprising a set of conditions regarding when an error is to be processed, and an environment state comprising information about a current state of the software application, and wherein the first code further comprises:

instructions, responsive to receiving an error identifier, the framework criteria, and the application criteria, to determine whether the error identifier is registered;

instructions, upon a determination that the error identifier is registered, to store the error identifier, the framework criteria, and a valid status;

instructions to retrieve a control callback using the error identifier, wherein the control callback is a software procedure in the software application;

instructions to call the control callback with the error identifier and the application criteria as parameters; and instructions to change the valid status to an active status;

executing the software application, wherein the software application invokes the first code and identifies the application criteria to the first code, and wherein the first error occurs during execution of the software application;

generating a first error report using a first subroutine; and storing the first error report in a memory.

* * * * *